(12) United States Patent
McNay

(10) Patent No.: US 8,451,105 B2
(45) Date of Patent: May 28, 2013

(54) SECURITY AND DRIVER IDENTIFICATION SYSTEM

(76) Inventor: James Holland McNay, Nashville, TN (US)

( * ) Notice: Subject to any disclaimer, the term of this patent is extended or adjusted under 35 U.S.C. 154(b) by 444 days.

(21) Appl. No.: 12/587,489

(22) Filed: Oct. 8, 2009

(65) Prior Publication Data

US 2010/0214083 A1     Aug. 26, 2010

Related U.S. Application Data

(60) Provisional application No. 61/208,496, filed on Feb. 25, 2009.

(51) Int. Cl.
*B60R 25/10* (2006.01)

(52) U.S. Cl.
USPC ........ 340/426.11; 340/5.53; 340/5.83; 340/539.13; 340/568.1; 455/411

(58) Field of Classification Search
USPC ........ 340/5.2, 5.3, 5.51–5.53, 5.6, 5.61, 340/5.64, 5.7, 5.8–5.83, 539.11, 539.13, 340/573.1, 573.4, 572.1, 568.1, 426.1, 426.11; 455/410–411; 382/115, 124
See application file for complete search history.

(56) References Cited

U.S. PATENT DOCUMENTS

| | | | |
|---|---|---|---|
| 7,414,527 B2 * | 8/2008 | McNay | 340/539.13 |
| 2004/0214596 A1 * | 10/2004 | Lee | 455/552.1 |
| 2008/0200209 A1 * | 8/2008 | Cahoon | 455/557 |
| 2009/0219135 A1 * | 9/2009 | Harvey et al. | 340/5.82 |

* cited by examiner

*Primary Examiner* — Thomas Mullen

(57) ABSTRACT

A security and driver identification system for use within the commercial transportation industry and which can be applied to private vehicles. The central component of the system is a telecommunications mobile terminal located within the vehicle with primary capability being to positively identify driver and vehicle to facilitate transceiver wireless communications between vehicle and authorized personnel. The telecommunications mobile terminal is preprogrammed with wireless network number, and is accessible and security procedure implemented by biocell phone communication from authorized driver.

9 Claims, 1 Drawing Sheet

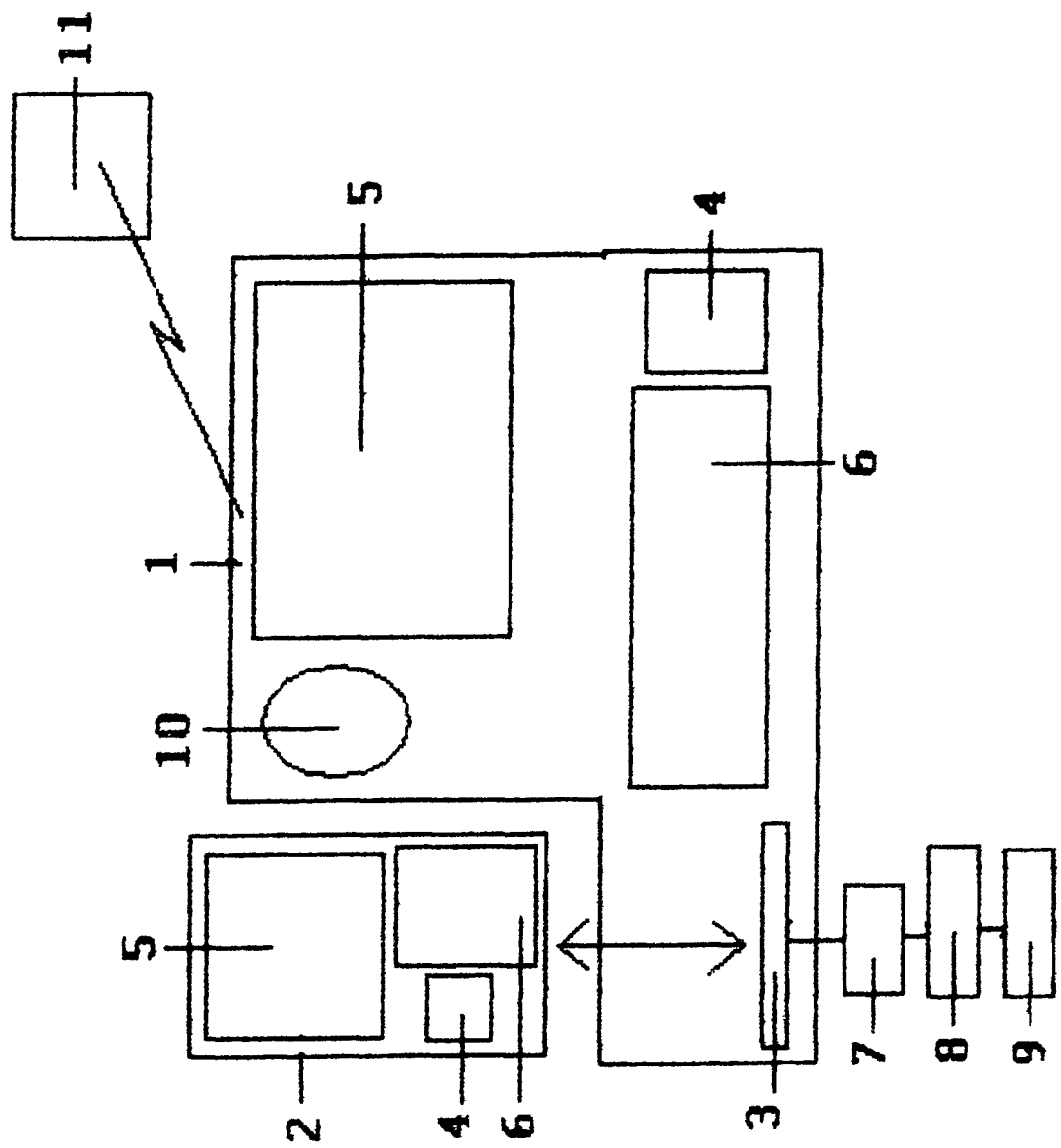

SECURITY AND DRIVER IDENTIFICATION SYSTEM

CROSS-REFERENCE TO RELATED APPLICATIONS

The present application is a continuation-in-part of U.S. provisional patent application Ser. No. 61/208,496, filed Feb. 25, 2009, for SECURITY AND DRIVER/VEHICLE IDENTIFICATION SYSTEM FOR COMMERCIAL AND PRIVATE VEHICLES, by James H. McNay, included by reference herein and for which benefit of the priority date is hereby claimed.

BACKGROUND OF THE INVENTION

Cargo theft in the United States has reached gigantic proportions. The FBI conservatively estimates annual losses at between $15.0 billion and $30 billion annually, while the Volpe Report from the Department of Transportation estimates indirect costs of those losses at between $20 billion and $60 billion annually. A disturbing number of those thefts (40% by some estimates) involve driver and warehouse personnel complicity. Additionally, according to the FBI, private vehicle thefts in the year 2007 amounted to $7.4 billion in losses.

The safe and secure transport of hazardous materials (hazmat) and high-value cargo in the United States is a critical concern, particularly in light of the terrorist attacks on Sep. 11, 2001. Over 800,000 hazardous material loads are hauled per day by commercial motor vehicles (CMVs); therefore, these vehicles are potential targets for hijacking and use as mobile weapons of mass destruction (WMD). Furthermore, on a daily basis, over 50,000 loads of high-value commodities (electronics, apparel, pharmaceuticals, etc.) are hauled by large trucks, which are attractive targets for increasingly bold cargo thieves. Theft of high-value cargo incurs costs of millions of dollars per year in losses to trucking companies and their insurance carriers. Reducing the vulnerability of these vehicles to acts of theft and domestic terrorism is vital. In addition, the ability to respond rapidly to hazmat incidents is crucial following an accident or attack.

The threat of a theft or hijacking of a large truck transporting hazmat and using it as a weapon of mass destruction is a major concern. In addition, mobile communications services may not be typically deployed in these locations due to unique geography and other factors. As a result, a major goal of this invention is to improve communications in the event of an emergency, while enhancing trucking operations en route and for each phase of movement—pick up, delivery, receipt, and storage.

Trailer theft by deception or conspiracy is not uncommon. Fraudulent authorization papers presented to facility security by driver at open facilities will allow driver to enter and depart facility with theft or terrorist activity intended.

Many facilities are closed, with entrance unprotected and an absence of facility personnel, where loaded commercial trailers are parked, left vulnerable to theft. Unfortunately, conspiracy between facility personnel and security personnel and drivers can occur, and theft takes place. Some security programs at facilities are ineffective, because guards cannot be everywhere at all times, and thieves seize opportunities to steal commodities aboard cargo trailers and/or vehicles.

Other measures of security presently employed include cameras and seals or locks on trailer doors, but cameras are easily rendered inoperable, and seals and locks can be cut with bolt cutters or a hacksaw, thus enabling theft activity.

Satellite communication is effectively employed in specific areas of commercial trucking operations, such as over-the-road movement/parking, and is primarily a 'tracking' system that 'observes' from outer space, to track trailers/trucks deploying satellite receptor/charger technology at vehicles, trucks/trailers. However, satellite tracking, while useful in some areas of the industry, is susceptible to atmospheric and technical, location interference. It also does not identify and verify/detect the authorization/unauthorization of drivers departing or entering vehicles to operate vehicles, to initiate authorized operations, nor does it identify or associate the trailer with commodities within the trailer.

Multiple satellite tracking of trucks and trailers, loading/unloading/security parking, damage control, positive driver identification/vehicle identification of every driver/truck in operation at the facility is absent in satellite programming. In addition, the effectiveness of the satellite tracking system is dependent on an attachment at the trailer to accommodate satellite tracking signal, and any attachment to a trailer is susceptible to vandalism and/or damage resulting in a malfunction of the system, thus allowing the opportunity for theft activity.

While some commercial transportation facilities' receiving and shipping departments do have computerized tracking systems in place, they are simply that—tracking systems for tractors, containers/trailers within that particular facility. None are integrated/programmed to instantly detect, analyze, and communicate certain violations at tractor-trailers to authorized drivers, facility security and additional authority such as police, etc.

Systems such as Lojack can be helpful in locating a vehicle AFTER it has been stolen, but by then damage or vandalism may have occurred to the vehicle and the commodities or contents will have been compromised. It can take thieves less than an hour to steal a loaded trailer, unload it and abandon it.

Vehicle alarm systems at vehicles/automobiles are ineffective. They can be activated by high winds, someone leaning against the vehicle, or even a malfunction. Deception/conspiracy allowing thief personnel to enter vehicle and insert copied/stolen key at ignition and steal vehicle occurs.

It is an object of this invention to provide a security system that disallows unauthorized vehicle engine ignition, to instantly alert authorized personnel when unauthorized detected violation at vehicle is initiated and allows authorized driver effective reaction to contact authority or police of violation.

It is another object of this invention to have a security system in place that instantaneously detects and defines unauthorized activity such as intrusion into a vehicle.

It is another object of this invention to alert authorized drivers, facility security and other authorities instaneously when tampering of a vehicle occurs.

It is another object of this invention to instantly activate vehicle engine cancellation assembly (VEIC) when authorized driver departs vehicle with biometric cell phone. Engine ignition can only be accomplished when authorized driver returns to vehicle and applies biometric cell phone to the biometric cell phone receptor/charger located within the vehicle's telecommunications mobile terminal.

It is another object of the invention to positively recognize and detect specific violations at parked vehicle, and to communicate specific violation to authorized vehicle owner or operator, via programmed telecommunications mobile terminal to authorized driver/operator's cell phone.

It is another object of the invention to positively identify authorized driver and the assigned vehicle that the driver is authorized to operate, in order to deter deception, conspiracy, theft or terrorist activity.

Strategic points of the invention application will be at commercial facilities, truck stops, parking lots, warehouses, truck company facilities, and strategic areas to deter theft and terrorist activity, such as at border crossings, ports of entry, airport areas, government and military facilities.

FIELD OF THE INVENTION

The present invention relates generally to security programs at strategic operational areas covering the commercial transportation industry, implementing innovative programmed technology that will positively identify drivers and vehicles, commercial and private, to enhance authorized facility operations and significantly impact and eliminate theft of vehicles, commercial vehicles, commercial trailers and commodities aboard parked commercial cargo containers, by providing instantaneous notification and classification of specific unauthorized tampering of vehicle to authorized operational personnel, facility security, and other authorized personnel, police, etc. Programs initiated at truck telecommunications mobile terminal involving biometric technology application initiating driver and truck identification will implement primary and secondary security programs. Primary program=Standard process. Secondary program=security alert.

SUMMARY OF THE INVENTION

In accordance with the present invention, there is provided a security and identification system for deployment within the commercial trucking transportation industry, also applicable to private automobile vehicles.

The central component of the system is a wireless telecommunications mobile terminal located within the truck. The primary capability of this telecommunications mobile terminal is facilitating communications between identified truck driver and authorized designated network participants, and to provide verification of driver/truck/trailer identification. The telecommunications mobile terminal is a terminal programmed with wireless network number, and is accessible only by authorized driver to initiate positive security driver/truck identification via driver assigned preprogrammed biometric cell phone and biometric cell phone receptor/charger (BCR) integrated with the telecommunications mobile terminal.

Components of this invention include, but are not limited to (1) a telecommunications mobile terminal; (2) a biometric cell phone, (3) a biometric cell phone receptor/charger, (4) a fingerprint reader, (5) a text screen, (6) a keyboard (7) a speaker, (8) an electronic engine control assembly, and (9) a vehicle engine ignition cancellation assembly.

In the case of commercial transportation vehicles entering or departing at closed or open facilities, maximum security involving protected wireless transmission between vehicle and facility computer wireless network is priority. Arriving vehicle enters facility wireless transmission perimeter and the wireless telecommunications mobile terminal is detected and read by facility wireless computer network. Arriving vehicle is positively identified at facility computer network.

Text and voice communications between vehicle driver and facility authority are initiated. Facility authority is aware of presence of truck within wireless perimeter of facility to initiate security and operations efficiency.

BRIEF DESCRIPTION OF THE DRAWINGS

A complete understanding of the present invention may be obtained by reference to the accompanying drawings, when considered in conjunction with the subsequent, detailed description, in which:

FIG. 1 is a perspective view of all of the elements contained in the present invention, including a telecommunications mobile terminal, a biometric cell phone, a biometric cell phone receptor/charger, a fingerprint reader, a text screen, a speaker, a keyboard, an electronic engine control assembly, and a vehicle engine ignition cancellation assembly.

DESCRIPTION OF THE PREFERRED EMBODIMENT

The present invention is a method and apparatus for verifying the identity of an authorized driver, vehicle assigned to that authorized driver, and commodities aboard the vehicle. The invention is described in the context of a commercial tractor-trailer vehicle having a telecommunications mobile terminal in contact with a central station in a facility.

While the description of the present invention is described in the context of tractor-trailers and passenger cars, it should be noted that the invention may also be used at strategic locations including, but not limited to, bank automated teller machines, airport check-in, border crossings and any place else where positive identification of an individual is required.

While the description of the present invention is described in the context of tractor-trailer and passenger cars, it should be noted that the invention may also be applicable to other strategic locations where positive identification of an individual is required.

Reference is made to FIG. 1, which illustrates the apparatus necessary for the new method of positively identifying an authorized driver, vehicle assigned to that driver; and commodities contained in the cargo container.

Authorized driver enters assigned vehicle, with biometric cell phone 2, inserts key in ignition 7, applies fingerprint at driver biometric cell phone 2, dials assigned code number, speaks name and activates biocell phone network communications. Driver then inserts activated biocell at the biometric cellphone receptor/charger 3, and initiates communications with mobile telecommunications terminal 1 and communication with the vehicle engine ignition control modem 8, integrated into the electronic engine control assembly 9, deactivating the engine ignition cancellation. Driver then turns key at vehicle ignition 7 and activates vehicle engine. Positive driver/vehicle identification is transmitted to the facility computer network 11 with this driver security process. When authorized driver departs assigned parked vehicle, he will extract driver biometric cell phone 2 from the biocell receptor/charger 3, automatically activating the vehicle engine ignition cancellation modem 8, disallowing unauthorized engine activation during authorized driver's departure/absence from authorized driver assigned vehicle.

Authorized driver departs vehicle with biometric cell phone 2. If unauthorized entry to vehicle occurs, in an attempt to start the vehicle engine, the authorized driver will be alerted to this unauthorized activity at the parked vehicle at their driver biometric cell phone 2.

The biometric fingerprint reader 4 at the telecommunications mobile terminal 1 is programmed to recognize authorized driver biometric identification, which will initiate network communications at mobile telecommunications terminal 1, which in turn will communicate with the facility computer network 11.

When authorized truck arrives at consignee facility entrance gate, the facility security program will run. The facility Gate Radio Frequency Detector (R/D) wireless transceiver, strategically located at entrance gate will read the preprogrammed information at the telecommunications mobile terminal 1 aboard the arriving truck, and will initiate communications with vehicle telecommunications mobile terminal 1, and the preprogrammed information thereon will be communicated to and confirmed at the authority facility's wireless computer network 11.

Facility security program instructions will be relayed to vehicle driver via text message displayed at the telecommunications mobile terminal 1 text video screen 5, or voice communications at the telecommunications mobile terminal speaker 10 or at authorized driver's biometric cell phone 2.

The telecommunications mobile terminal 1 preprogrammed information communicated to facility computer network 11 will detail factual information pertinent to specified operations participants' integrated involvement with arriving shipment operations from shipper point of loading identifying driver, truck, truck company, trailer number, shipper identification, and commodities aboard incoming freight to point of consigned facility.

To gain authorized access into facility, driver will initiate the driver/vehicle security identification process at the truck telecommunications mobile terminal 1.

The verification process of driver/vehicle identification initiated by driver at the truck telecommunications mobile terminal 1, implementing driver biometric cell phone, will authorize scheduled vehicle entry to facility.

Authorized driver follows security identification process at assigned vehicle telecommunications mobile terminal 1, activating wireless network communications, and positively identifying driver and vehicle.

To activate facility security programs, driver/vehicle identification procedures are implemented by authorized driver at truck telecommunications mobile 1 terminal.

Example

A truck equipped with a telecommunications mobile terminal 1, scheduled to deliver freight to consignee facility, is positioned with truck engine activated, at an area close to assigned facility within the facility wireless computer 11 wireless perimeter. If the facility wireless network 11 was deployed, the truck telecommunications mobile terminal 1 would have been read by the facility computer network 11 when truck entered the wireless perimeter, and if truck is positively identified by facility computer network 11 reading preprogrammed truck telecommunications mobile terminal 1, directions to the facility entrance and designated facility security phone number would be displayed at telecommunications mobile terminal 1 text screen 5 for driver convenience.

Driver will follow facility security instructions displayed at telecommunications mobile terminal 1 text screen 5 and proceed to specific facility entrance. Driver will approach consignee facility entrance preparing to initiate positive driver/truck security identification process at truck telecommunications mobile terminal 1. Driver arrives at consignee's facility designated entrance, and the truck telecommunications mobile terminal 1 is read by the strategically placed gate Radio Frequency Detector (R/D) wireless transceiver, alerting facility security of truck arrival at gate. All trucks entering/exiting at facility deploying Gate Radio Frequency Detector (R/D) and facility computer network 11 require driver to initiate driver/truck security identification process at truck telecommunications mobile terminal 1 to be authorized to enter/exit facility.

At facility entrance prior to entry, truck driver extracts driver biometric cell phone 2 from the biocell receptor/charger 3, and applies primary fingerprint at biometric cell phone 2, dials driver assigned four (or any number) digit code number at biometric cell phone 2, speaks name, and then inserts biometric cell phone 2 back at the programmed biocell receptor/charger 3, activating wireless communications from truck preprogrammed telecommunications mobile terminal 1 to facility computer network 11. Communication positively identifies driver, truck, truck company, shipper, commodities aboard assigned trailer, and trailer identification. Positive result of driver security process at truck telecommunications mobile terminal 1 allows authorized entry at facility. Text and voice communications between facility authority and truck driver are implemented and sustained. At closed gated facilities deploying the Gate Radio Frequency Detector (R/D) transceiver, when positive communication is established between the truck telecommunications mobile terminal 1 and the facility Gate Radio Frequency Detector (R/D), and facility computer network 11, the Gate Radio. Frequency Detector (R/D) will activate the gate locking mechanism, and open gate, allowing authorized entry to facility.

A negative result output by the truck telecommunications mobile terminal 1 will alert facility security to implement security procedures to allow positive effective investigation. Truck will be denied entry at facility.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A security and driver identification system for commercial and private vehicles for providing security and verification of an authorized driver, of an assigned vehicle, and of commodities on board the vehicle comprising:

means for positively identifying the authorized driver;
  means for positively identifying the assigned vehicle;
  means for positively identifying commodities contained in a trailer or cargo container attached to the assigned vehicle;
  means for carrying out fingerprint identification of the authorized driver on a biometric cell phone associated with the authorized driver;
  means for initiating communication between the authorized driver and a facility computer network;
  means for additionally initiating text communication between the authorized driver and the facility computer network;
  means for additionally initiating voice communication between the authorized driver and the facility computer network; and
  means for cancelling the assigned vehicle's ignition in the event of intrusion into or movement of the assigned vehicle, or removal of a commodity therefrom.

2. The security and driver identification system for commercial and private vehicles in accordance with claim 1, wherein said means for positively identifying the authorized driver comprises a biometric cell phone preprogrammed with the authorized driver's biometric information (fingerprint) and other identifying information.

3. The security and driver identification system for commercial and private vehicles in accordance with claim 1, wherein said means for positively identifying the vehicle assigned to the authorized driver comprises a preprogrammed telecommunications mobile terminal, activated by inserting the biometric cell phone associated with the authorized driver in to a biometric cell phone receptor located on the telecommunications terminal located in the vehicle.

4. The security and driver identification system for commercial and private vehicles in accordance with claim 1, wherein said means for positively identifying commodities contained in a trailer or cargo container attached to the assigned vehicle, comprises a preprogrammed telecommunications mobile terminal located in the vehicle, activated by insertion of the biometric cell phone associated with the authorized driver in to the biometric cell phone receptor located on the telecommunications mobile terminal located in the vehicle.

5. The security and driver identification system for commercial and private vehicles in accordance with claim 1, wherein said means for carrying out secondary fingerprint identification of the authorized driver comprises a fingerprint reader located on the telecommunications mobile terminal located in the vehicle.

6. The security and driver identification system for commercial and private vehicles in accordance with claim 1, wherein said means for initiating communication between the facility computer network and the authorized driver comprises the telecommunications mobile terminal located in the vehicle.

7. The security and driver identification system for commercial and private vehicles in accordance with claim 1, wherein said means for additionally initiating text communication between the authorized driver and the facility computer network, comprises a screen and a keyboard located on the telecommunications mobile terminal located in the vehicle.

8. The security and driver identification system for commercial and private vehicles in accordance with claim 1, wherein said means for additionally initiating voice communication between the authorized driver and the facility computer network, comprises a speaker located on the telecommunications mobile terminal located in the vehicle.

9. The security and driver identification system for commercial and private vehicles in accordance with claim 1, wherein said means for cancelling the vehicle's ignition in the event of intrusion into or movement of the assigned vehicle, or removal of a commodity therefrom, comprises a biometric cell phone receptor, (connected to a vehicle ignition cancellation system), located on the telecommunications mobile terminal located in the vehicle.

* * * * *